Patented Nov. 29, 1932

1,889,644

UNITED STATES PATENT OFFICE

HANS RUDOLPH SCHMEDES DE LA ROCHE, OF BREMEN, GERMANY

METHOD OF REFRACTORY COVERING IRON AND METAL STRUCTURES

No Drawing. Application filed January 30, 1931, Serial No. 512,509, and in Germany September 8, 1930.

Iron and metal structures, especially cast iron and steel frames for buildings, could hitherto not effectively be covered with a refractory layer, although in the case of reinforced concrete buildings, in which no iron structure in skeleton shape was used, the wire or similar reinforcing inserts are protected against rust by the concrete.

On the other hand the direct application of masses petrifying after setting, especially Sorrel cement or mortar on to iron is not possible because the iron would very soon become completely rusty. The cause of this is to be attributed to the presence of hygroscopic salts. It is known to paint iron with insulating coatings of red lead or the like under the coating of paint.

The object of the invention is to avoid the inconveniences occurring at the employment of Sorrel cement coverings. A fire-and rust proof covering of iron or metal constructions with Sorrel cement is obtained. It is particularly advantageous to make the applied Sorrel cement-like mass itself proof against water, fire and changes in volume.

The invention consists in providing the metal base, prior to the application of the Sorrel cement, with an insulating layer, for example an insulating coating of rust protective substances, asphalt or cement, red lead or the like.

A further feature of the invention consists in that the metal base having a coating of rust protecting medium is covered with Sorrel cement, which is not hygroscopic, and on which a weatherproof coating is formed.

The invention also relates to first applying a covering layer, preferably of magnesite, magnesite compositions or the like, to the rust protecting coating, which covering layer renders harmless any existing or absorbed moisture with the salts dissolved therein.

It is also new, that the mass, which is applied on the rust protecting coating, consists of an excess quantity of magnesium oxide mixed with admixture substances, to which pure carbonate of lime is added, so that the mass composed of magnesium chloride or magnesium sulphate and water can, after hardening, be provided with a coating of fluoride, which, owing to the calcium compounds forming in the mass, converts into an insoluble lime fluoride compound and thus becomes weatherproof.

The method according to the invention is carried out for example in the following manner:

The iron or metal base is first provided with a rust protecting coating, for example of red lead, asphalt, rust protecting medium, such as rust protecting paint, so called solution (solvent, naphtha compounds) or the like. A petrifying mass, such as Sorrel cement, is then applied. The Sorrel cement covers the iron base in such a manner that this latter is protected against corrosion and against the action of fire. For the purpose of effectively applying the coating the mortar, sand or gravel may be sprayed on to the insulating coating. It is also possible, to first apply a covering layer to the insulating layer, which covering layer consists of mixtures containing magnesite or magnesite in excess, and to apply the Sorrel cement over this covering layer.

Another means of carrying out the method is, to apply nonhygroscopic Sorrel cement directly on to the rust protecting or insulating coating. Such Sorrel cement is manufactured for example in the following manner:

Pure carbonate of lime is added to magnesium oxide mixed in excess with admixture substances, such as pulverized asbestos, pumice stone, powder, infusorial earth, stone powders, sawdust, corkdust, kieselguhr or the like. The dressing of the mass is effected with magnesium sulphate and water, eventually also with magnesium chloride, with the addition of calcium chloride. It is important for the magnesium oxide, as compared with the salts contained in the mixing liquids, to be employed in excess up to 50% and more, so that its acts as admixture substance.

Owing to the addition of carbonate of lime and calcium chloride, calcium compounds are contained in the mass which, on an outer coating being applied to the petrified mass, chemically combined with and convert this coating into a compound insoluble in water and make same weatherproof.

After applying such a Sorrel cement containing carbonate of lime to the iron base, a fluorine compound soluble in water is applied as a coating and forms insoluble lime fluoride with the lime compounds.

When employing Epsom salts solutions, the petrified mass is first preferably coated with barytes compounds, and then a waterproof covering is obtained with the fluorides. If necessary, several coatings of fluorides can be employed. The employment of silicate coatings, which can also be imagined, is not to be generally recommended, owing to the formation of easily soluble salts.

It is the addition of carbonate of lime which enables the application of a weatherproof coating. The fireproofness of the material is also increased thereby. Calcium chloride effects an adaptation of the capability of setting to the actually existing temperature conditions. The resultant lime compounds also allow the use of mineral oil paints and oil paints for the coating.

The following is an example of carrying out the method:

1 part by weight of magnesium oxide is mixed with 1 to 2 parts of admixture substances of known kind, and about 10% of carbonate of lime is added thereto. Further Epsom salts can be directly added to the mass in dry condition, whereupon the dressing is effected with water. The mixing is effected until earth moisture is reached. If necessary 5 to 10 parts of calcium chloride solution may also be added.

After the iron or metal structures have been coated with rust proof paints or the like, the mass is applied before the setting. After the setting the hardened mass is painted with a fluorine compound capable of forming calcium fluoride, if desired after a previous application of barium compounds.

By this method the iron remains undestroyed and corrosive actions do not take place. The coated complete structure does not suffer under the action of fire, the iron bases under the mass being merely heated to temperatures which are nowhere near the maximum resistance of the iron.

The iron girders may, if desired, be filled with masonry on their webs or between their arms, if necessary after the application of a pure cement coating, and thereafter a covering according to the new method may be applied.

I claim:

1. The method of protecting structural ferrous material which consists in coating the material with a rust proofing compound, covering the rust proof coating with a coating of Sorrel cement containing a calcium compound wherein the calcium is free to unite with fluorine, and treating the exterior of the cement with a fluorine compound capable of uniting with the calcium of the calcium compound to form calcium fluoride.

2. The method of protecting structural ferrous material which consists in coating the material with a rust proofing compound, covering the rust proof coating with a coating of Sorrel cement containing calcium chloride, and treating the exterior of the cement with a fluorine compound capable of uniting with the calcium of the calcium chloride to form calcium fluoride.

3. The method of protecting structural ferrous material which consists in coating the material with a rust proofing compound, covering the rust proof coating with Sorrel cement containing magnesium sulphate and containing a calcium compound wherein the calcium is free to unite with fluorine, coating the cement with a barium compound, and treating the exterior of the last coating with a fluorine derivative capable of penetrating the barium compound and uniting with the calcium compound to form calcium fluoride.

4. The method of protecting structural ferrous material which consists in coating the material with a rust proofing compound, covering the rust proof coating with Sorrel cement containing magnesium sulphate and containing calcium chloride, coating the cement with a barium compound, and treating the coating of barium compound with a fluorine derivative capable of penetrating the barium compound and uniting with the calcium of the calcium chloride to form calcium fluoride.

In testimony whereof I affix my signature.

HANS RUDOLPH SCHMEDES de LA ROCHE.